US006065583A

United States Patent [19]

Hoashi et al.

[11] Patent Number: 6,065,583

[45] Date of Patent: May 23, 2000

[54] SPEED-VARIABLE CONVEYOR

[75] Inventors: Kazuhiro Hoashi; Kuniaki Wakusawa, both of Hiroshima; Masao Yasukawa, Mihara, all of Japan

[73] Assignee: Mitsubishi Heavy Industries, Ltd., Tokyo, Japan

[21] Appl. No.: 08/865,709

[22] Filed: May 30, 1997

[30] Foreign Application Priority Data

Sep. 20, 1996 [JP] Japan .................................... 8-250194

[51] Int. Cl.[7] ...................................................... B65G 23/00

[52] U.S. Cl. ............................................ 198/334; 198/792

[58] Field of Search ..................................... 198/334, 792

[56] References Cited

U.S. PATENT DOCUMENTS

| | | | |
|---|---|---|---|
| Re. 27,944 | 3/1974 | Ayres et al. | 198/334 |
| 3,465,689 | 9/1969 | Ayres et al. . | |
| 3,709,150 | 1/1973 | Colombot | 198/334 |
| 5,571,254 | 11/1996 | Saeki et al. | 198/334 |

FOREIGN PATENT DOCUMENTS

| | | |
|---|---|---|
| 651533 | 2/1929 | France . |
| 1284056 | 1/1962 | France . |
| 2092640 | 1/1972 | France . |
| 2025371 | 12/1971 | Germany . |
| 7101656A | 4/1995 | Japan . |
| 1185913 | 3/1970 | United Kingdom . |
| 1218650 | 1/1971 | United Kingdom . |

*Primary Examiner*—Jospeh E. Valenza

[57] ABSTRACT

A speed-variable conveyor includes a belt-formed fibrous body deformable in a moving direction and a width direction, a plurality of rollers mounted on both ends in the width direction of the fibrous body, and a pair of guide rails for movably supporting the rollers and differing in spacing according to the moving speed of the fibrous body. The moving speed of the fibrous body is low where the width of the fibrous body is large, and high where the width is small. A support moving body contacting a lower surface of the fibrous body for driving the fibrous body is provided. This reduces a load applied to the fibrous body.

18 Claims, 14 Drawing Sheets

SPEED-VARIABLE CONVEYOR

FIELD OF THE INVENTION

This invention relates to a speed-variable conveyor, which is advantageously applicable, for example, to a speed-variable moving footway, a handrail for a footway, or a speed-variable moving footway belt.

DESCRIPTION OF THE PRIOR ART

As a conventional speed-variable moving footway, there has been proposed a pallet slide type moving footway disclosed in Japanese Patent Laid-open Publication 7-101656. A schematic plan view of this moving footway is shown in FIG. 13, and its schematic side view is shown in FIG. 14.

As shown in both Figures, this moving footway is provided with a plurality of pallets 23 which are movably disposed along a pair of guide rails 30. The entire footway is inversed S-formed when viewed in the plan view. The footway comprises a push-reversing unit and speed-variation units on both sides with respect to the moving direction and an intermediate high-speed unit. In the Figures, the reference numeral 21 indicates a reversing unit drive chain, 22 is a supporting roller, 24 is a rack chain, 25 is a reversing unit drive hook, 26 is a supporting roller drive motor, 27 is a line drive motor, 28 is a high-speed unit drive chain, 29 is a speed reducer, 31 is a line shaft, 32 is a high-speed unit drive hook, and 33 is a brake. In the moving footway, speed variation is achieved by sliding the individual pallets with respect to each other in the lateral direction.

FIG. 15 is a schematic side view of another conventional speed-variable footway. As shown in the Figure, this moving footway is a multi-stage conveyor type having a plurality of constant-speed belt conveyors, in which low-speed belt conveyors 41 are disposed on both sides with respect to the moving direction and a high-speed belt conveyor 42 is disposed at an intermediate section. Therefore, the get on/off section is low in speed ($V_i$) and the intermediate high-speed section is high in speed ($V_o$).

However, the above described conventional speed-variable moving footway has the following problems.

(1) Since, in the pallet slide type, there is discontinuity in movement between pallets, and in the multi-stage conveyor type, there is discontinuity in speed between conveyors, either of these types has a heavy burden on the passengers.

(2) Further, the pallet-slide type has problems of different moving directions between the get on/off direction and high-speed moving direction, an increased number of parts, and the like.

SUMMARY OF THE INVENTION

Therefore, a primary object of the present invention is to provide a speed-variable conveyor which can realize a speed-variable footway having no discontinuity in movement or speed change in the moving unit, being constant in moving direction, and simple in structure.

A further object of the present invention is to provide a speed-variable conveyor which can reduce the tension applied to the ropes constituting the net-like fibrous body, and facilitate design and manufacture of a practical machine.

In accordance with the present invention which solves the above prior art problems, there is provided a speed-variable conveyor, comprising:

a belt-formed fibrous body deformable in a moving direction and a width direction;

movable supporting members for supporting both ends in the width direction of the fibrous body; and a pair of guide rails movably supporting the supporting members and varying the spacing between the rails for changing the width of the fibrous body to change the moving speed of the fibrous body.

Further, in the speed-variable conveyor, a support moving body contacting a lower surface of the fibrous body is provided for driving the fibrous body.

The support moving body may be provided in a constant-speed moving section of the fibrous body.

Still further, the support moving body may be an endless belt.

Yet further, it may be arranged such that a protrusion provided in the fibrous body and a recess provided in the support moving body engage with each other for synchronizing the fibrous body with the support moving body.

Yet further, the support moving body may be provided in a constant-speed moving section of the fibrous body, and a synchronization screw may be provided in a speed-change section between the support moving body, the synchronization screw having a spiral groove which changes in pitch from an end towards the other end and engages the protrusion of the fibrous body.

Yet further, the supporting member may be a roller, which moves in synchronization with the support moving body.

Yet further, the speed-variable conveyor may be constructed as a speed-variable moving footway, the width of the guide rails is increased at the get-on port and the get-off port of the speed-variable moving footway so that the moving speed of the fibrous body is low, the width of the guide rails is narrowed in the intermediate section of the speed-variable moving footway so that the moving speed of the fibrous body is high, the width of the guide rails is gradually decreased in the boundary section from the get-on port to the intermediate section so that the moving speed of the fibrous body is gradually increased, and the width of the guide rails is gradually increased in the boundary section from the intermediate section to the get-off port so that the moving speed of the fibrous body is gradually decreased.

Yet further, the speed-variable conveyor may be constructed as a speed-variable moving footway and a speed-variable handrail provided along the speed-variable moving footway, the width of the guide rails is increased at the get-on port and the get-off port of the speed-variable moving footway and the speed-variable handrail to decrease the moving speed of the fibrous body, the width of the guide rails is decreased in the intermediate section of the speed-variable moving footway and the speed-variable handrail to increase the moving speed of the fibrous body, the width of the guide rails is gradually decreased in the boundary section from the get-on port to the intermediate section to gradually increase the moving speed of the fibrous body, and the width of the guide rails is gradually increased in the boundary section from the intermediate section to the get-on port to gradually decrease the moving speed of the fibrous body, so that the speed-variable moving footway and the speed-variable handrail move in synchronization with each other.

With the present invention of the above arrangement, the moving speed of the fibrous body is decreased in a section where the spacing between the guide rails is wide and the width of the fibrous body is large, and the moving speed is increased where the spacing between the guide rails is narrow and the width of he fibrous body is small. Therefore, when this speed-variable conveyor is applied, for example, to a moving footway and the width of the fibrous body is appropriately varied, a moving footway can be achieved which has no discontinuity in movement or speed nor burden on passengers as is in the prior art moving footways.

Further, in the speed-variable conveyor of the present invention, by supporting the portion of the fibrous body moving at a constant speed in the high-speed section and the low-speed section by a support moving body which moves in synchronization with the fibrous body, a load applied to the fibrous body of the constant-speed portion is supported by the support moving body. With this arrangement, a load supported by the tension of the fibrous body can substantially be only the load at the speed change portion from the low speed section to the high speed section and from the high speed section to the low speed section.

DESCRIPTION OF THE PREFERRED EMBODIMENTS

Embodiment 1

Figure 1A:
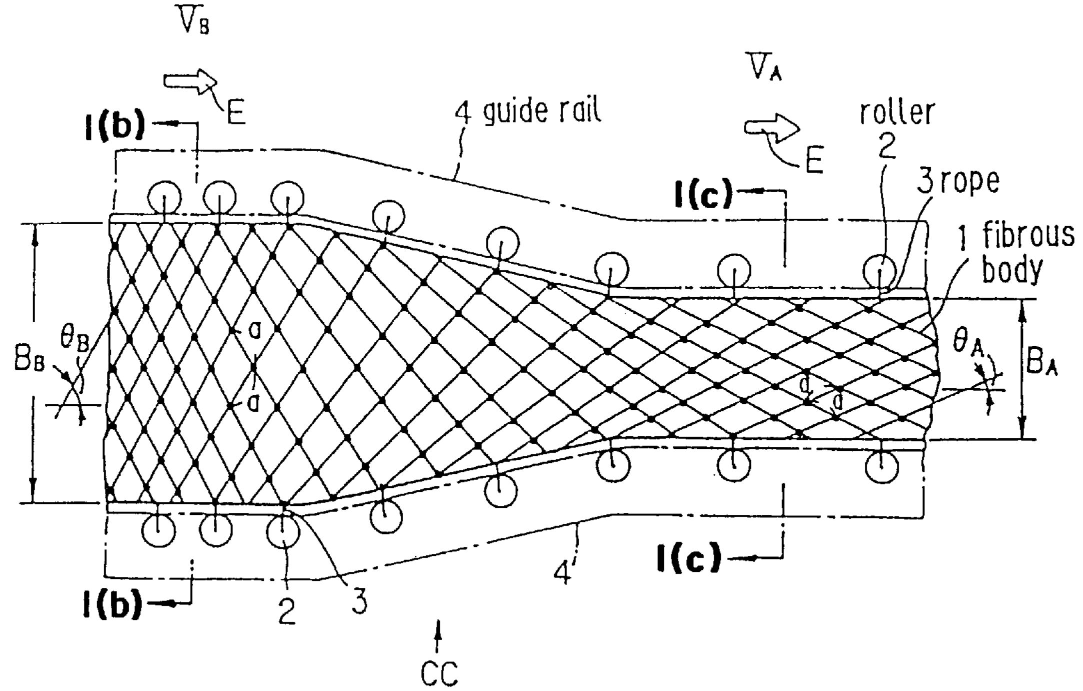
FIG. 1(*a*) is a schematic plan view showing the structure of the speed-variable conveyor according to the present invention, FIG. 1(*b*) is a schematic cross sectional view taken along line B—B in FIG. 1(*a*), FIG. 1(*c*) is a schematic cross sectional view taken along line A—A in FIG. 1(*a*), and FIG. 1(*d*) is a schematic enlarged view showing part of the fibrous body shown in FIG. 1(*a*)
Figure 1B:
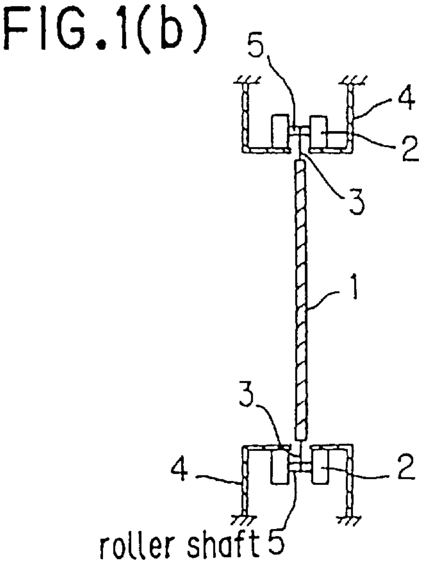
Figure 1C:
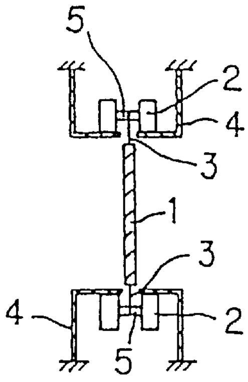
Figure 1D:
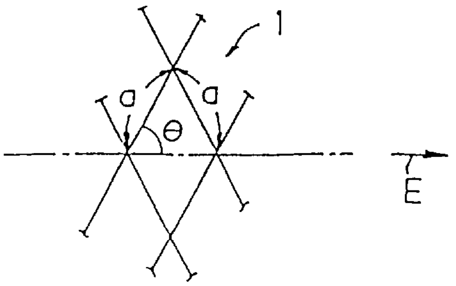

The speed-variable conveyor according to an embodiment 1 of the present invention is constructed as follows.

A belt-formed fibrous body, deformable in the moving direction and in the width direction, is formed of a strong fiber with a small elongation, in the form of a net and a belt as a whole, and, for example, rollers, as supporting members, are mounted to both ends in the width direction of the fibrous body with appropriate intervals.

These rollers are supported by a pair of guide rails provided at both sides in the width direction of the fibrous body, and roll on the guide rails along with the movement of the fibrous body. The intervals of the pair of guide rails can be appropriately varied to change the moving speed of the fibrous body.

That is, the moving speed of the fibrous body is low in the section where the interval of the guide rails is large and the width is the fibrous body is large, whereas the moving speed of the fibrous body is high in the section where the interval of the guide rails is small and the width of the fibrous body is small.

Further, to prevent a slack of the fibrous body in association with an increase and decrease in width of the fibrous body, the fibrous body may be given an initial tension. To give such an initial tension, the length of the moving path formed by the guide rails may be structured to be variable for adjustment.

Embodiment 1 according to the present invention will now be described in detail with reference to FIGS. 1 to 6.

In FIG. 1, the reference numeral 1 indicates a belt-formed fibrous body which is moved by drive means (not shown) in the direction of arrow E. The fibrous body 1 is formed of a fiber of small elongation in the form of a net and a belt as a whole which is deformable in the moving direction and in width direction, and a plurality of rollers 2 are mounted with appropriate intervals in the longitudinal direction of the fibrous body 1 through ropes 3 linked to a roller shaft 5.

The plurality of rollers 2 are supported by a pair of guide rails 4 whereby the rollers 2 roll on the guide rails 4 along with movement of the fibrous body 1.

The pair of guide rails 4 are formed to be wide in spacing in a section BB (section including B—B cross section), narrow in spacing in a section AA (section including A—A cross section), gradually decreasing in spacing in a boundary section (section CC) from the section BB to the section AA, according to this, the fibrous body 1 is also large in width in the section BB (width $B_B$), small in the section AA (width $B_A$), and gradually decreasing in the section CC. In other words, the spacing of the guide rails is set so that the fibrous body 1 has such a width. Further, in this case, an angle θ of the fiber constituting the fibrous body 1 to the moving direction of the fibrous body 1 is large (angle $\theta_B$) in the section BB, small (angle $\theta_A$) in the section AA, and gradually decreasing in the section CC.

By giving an appropriate tension in the moving direction to the fibrous body 1, the individual fibers can be made straight without a slack as shown in FIG. 1.

Therefore. in the speed-variable conveyor of the above structure, the moving speed of the fibrous body 1 is low (speed $V_B$) in the section BB, gradually increasing in the section CC, and high (speed $V_A$) in the section AA.

The principle of the variable moving speed of the fibrous body 1 will be described.

In FIG. 1, the moving speed of the fibrous body 1 is proportional to cos ($\theta$). Wherein $\theta$ is an angle of the moving direction of the fibrous body 1 to the fibers constituting the fibrous body 1.

Since the relationship between the angle $\theta_B$ in the section BB and the angle $\theta_A$ in the section AA is $\theta_B>\theta_A$, $\cos(\theta_A)>\cos(\theta_B)$, and therefore the speed $V_A$ in the section AA is higher than the speed $V_B$ in the section BB. To continuously change from $V_B$ to $V_A$, the width B of the fibrous body 1 may be continuously changed in order to continuously change the angle $\theta$.

Next, practical numerical values will be described.

Figure 2:
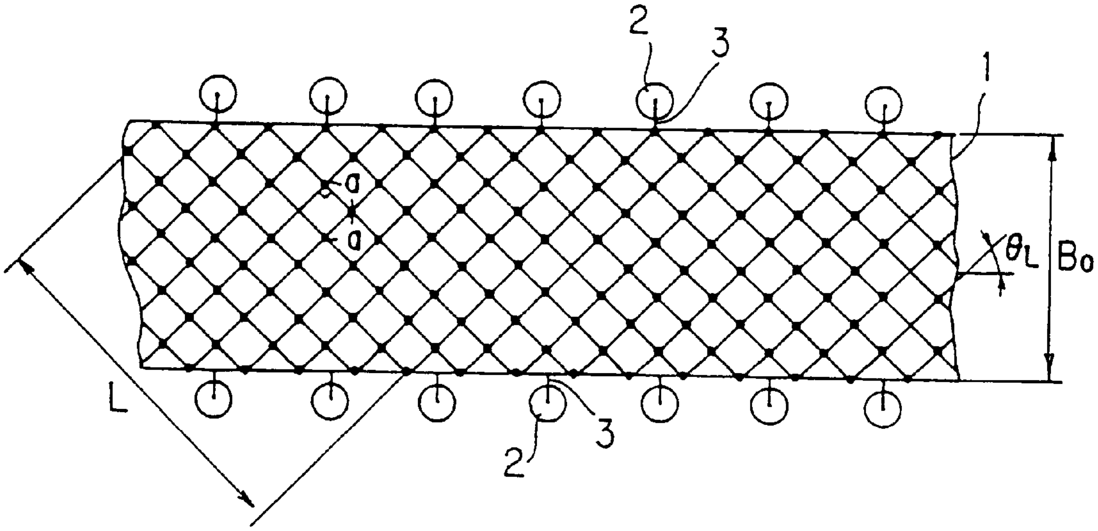
FIG. 2 is a schematic plan view when the fibrous body 1 is in a free state.

FIG. 2 is a plan view when the fibrous body 1 is free, that is, the rollers 2 are not supported by the guide rails 4. As shown in FIG. 2, the fibrous body 1 is formed to have a constant width $B_o$ when it is in a free state.

When the fibrous body 1 has a constant width $B_o$ in a free state, and the angle $\theta$ from the moving direction of the fibers is 45 degrees for simplicity, a length L of the fiber is $L=B_o/\sin(45\text{ degrees})$.

Further, when $\theta_A$ and $\theta_B$ are determined as $\theta_A=45$ degrees$-\delta$ and $\theta_B=45$ degrees$+\delta$, since $\theta_A+\theta_B=90$ degrees, a ratio of speed is:

$$V_A/V_B=\cos(\theta_A)/\cos(\theta_B)$$

$$=\sin(\theta_B)/\cos(\theta_B=\tan(\theta_B)$$

As a result, the speed ratio ($V_A/V_B$) can be flexibly set by appropriately selecting $\theta_B$.

For example, when the speed ratio is set to 2, from $\tan(\theta_B)=2$, $\theta_B=63.4$ degrees. Further, $\theta_A=90$ degrees$-\theta_B=$ 26.6 degrees.

In this case, the values of $B_A$ and $B_B$ are determined by the following equations.

$$B_A=L\sin(\theta_A)$$

$$B_B=L\sin(\theta_B)$$

Conversely speaking, when $B_A$ and $B_B$ are determined by the above equations, the speed ratio is 2.

Further, the size $B_o$ of the fibrous body 1 in the free state is $$B_o=L\sin(45\text{ degrees})$$

Also in FIG. 1, the length L of the fibrous body 1 is considered to be constant without elongation. The symbol a shown in FIG. 1 is a length of a side of mesh of the net.

The speed-variable conveyor of the above arrangement can be applied to various types of speed-variable moving footway. Practical application examples will be described below.

Figure 3:
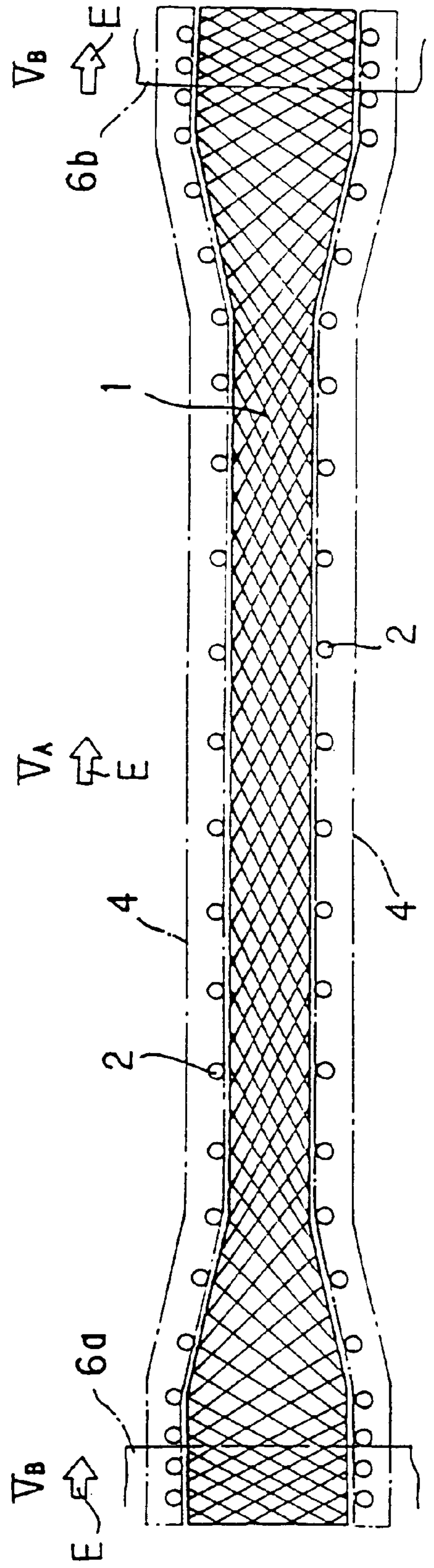
FIG. 3 is a schematic plan view showing the structure when the speed-variable conveyor according to the present invention is applied to a moving footway.

As shown in FIG. 3, the fibrous body 1 is provided over from beneath a plate 6*a* provided at the get-on port to beneath a plate 6*b* provided at the get-off port. The fibrous body 1, as shown in FIG. 4, is formed in a loop in side view along with the guide rails, and the plurality of rollers 2 mounted to both ends in the width direction with appropriate intervals through ropes 3 are supported on the guide rails 4.

Further, the fibrous body 1, as shown in FIG. 3, is large in width in the vicinity of the get on/off ports at both sides of the moving direction, according to the shape of the guide rails 4, narrow in the midway (intermediate section), gradually decreasing in width in the boundary section from the vicinity of the get-on port to the intermediate section, and gradually increasing in width in the boundary section from the intermediate section to the vicinity of the get-off port.

Figure 4:
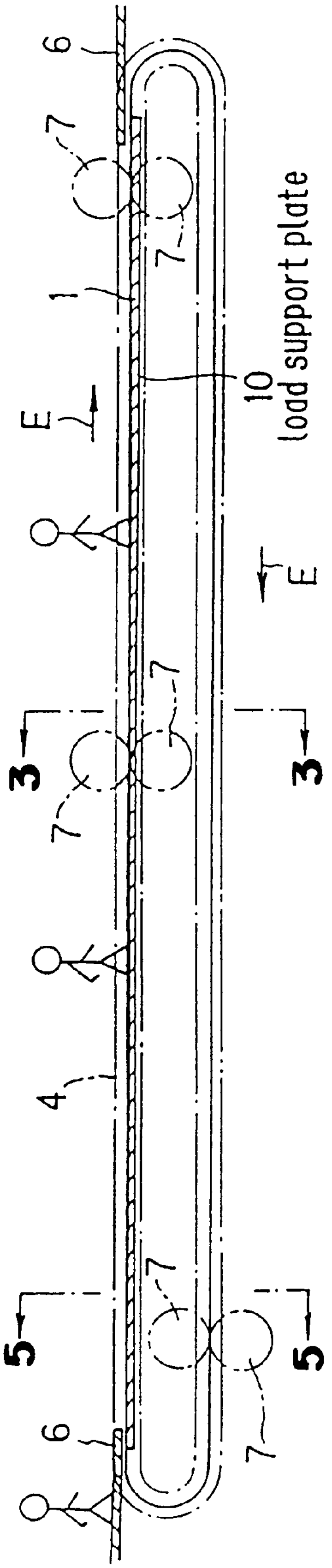
FIG. 4 is a schematic side view of the moving footway shown in FIG. 3.

Still further, as shown in FIG. 4, a plurality of pairs of upper and lower drive rubber tires 7 are disposed with the fibrous body 1 between with appropriate intervals in the longitudinal direction of the fibrous body 1.

Figure 5A:
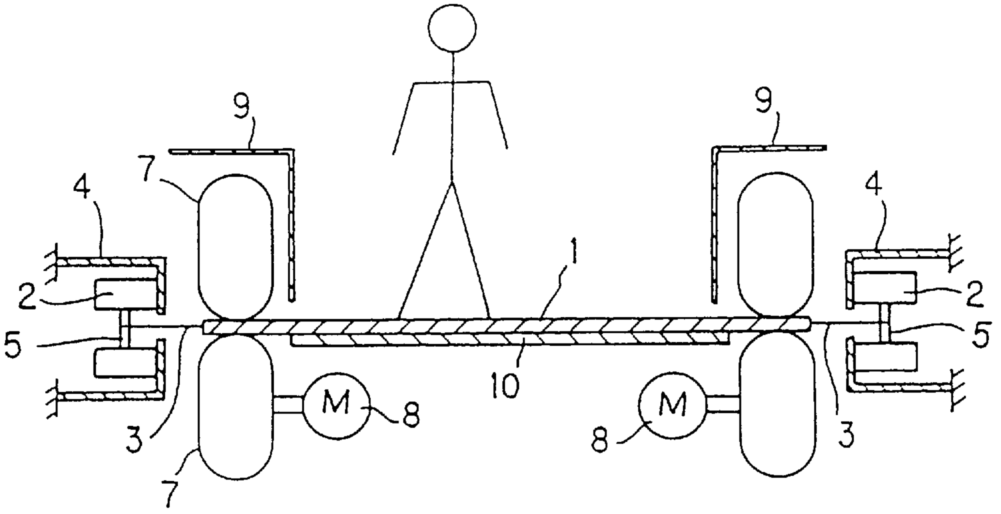
FIG. 5(*a*) is a schematic enlarged cross sectional view taken along line C—C of FIG. 4, and FIG. 5(*b*) is an enlarged cross sectional view taken along line D—D of FIG. 4.
Figure 5B:
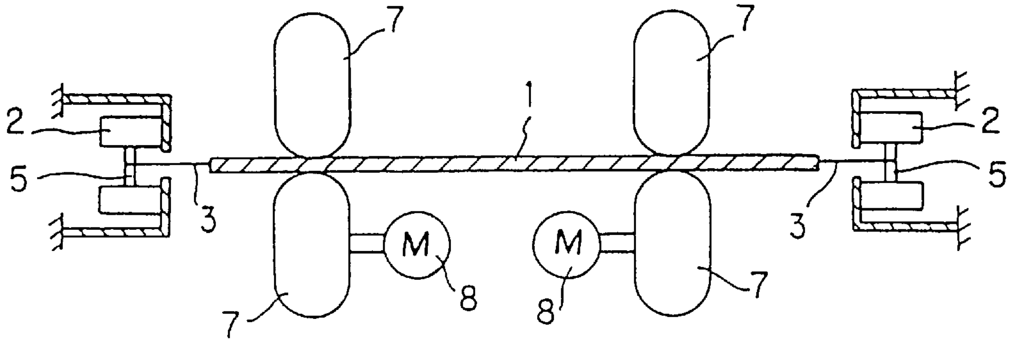

The drive rubber tires 7 for the individual upper sets (two sets in the shown example), as shown in FIG. 5(*a*), are disposed at both ends in the width direction of the fibrous body 1 where passengers will never get on, and protected with a cover 9 for preventing contact with a passenger. On the other hand, the drive rubber tires 7 for the individual lower set (one set in the shown example), as shown in FIG. 5(*b*), since they will never be mounted by passengers, can be disposed at an optional position in the width direction of the fibrous body 1. The lower drive rubber tires 7 for the individual sets are connected to tire drive motors 8.

Yet further, a load support plate 10 is disposed inside the fibrous body 1, and the fibrous body 1 moves while sliding on the load support plate 10.

Therefore, with the moving footway of the above arrangement, when the drive rubber tires 7 are driven by the tire drive motors 8, the fibrous body 1 is driven by the drive rubber tires 7 to move in the direction of arrow E in FIG. 4. The moving speed of the fibrous body 1 in this case is low speed $V_B$ in the vicinity of the get on/off ports, high speed $V_A$ in the intermediate section, gradually increases in the boundary section from the vicinity of the get-on port to the intermediate section, and gradually decreases in the boundary section from the intermediate section to the vicinity of the get-off port.

As a result, passengers can easily get on and off at the low-speed sections, and carried at a high speed midway. Further, since the moving unit is formed of the fibrous body 1 as a continuous body, and there is no discontinuity in movement or speed change of the fibrous body 1, the passengers do not have a burden, thereby improving the safety. Still further, a vertical load of the passengers is supported by the load support plate, and an excess tension is not produced in the fibrous body 1.

Yet further, in the moving footway of the above arrangement, the get on/off directions and the high speed moving direction are in line with each other, the number of parts is small, and is simple in structure.

Embodiment 2

Figure 6:
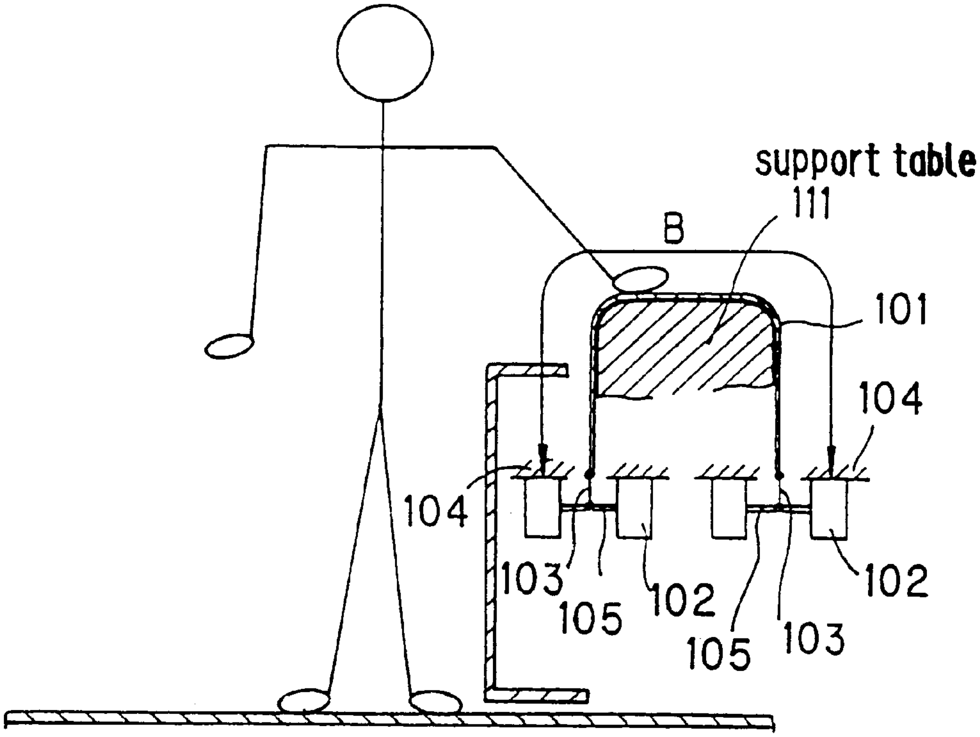
FIG. 6 is a schematic cross sectional view showing the structure of a speed-variable handrail according to an embodiment 2 of the present invention.

FIG. 6 shows embodiment 2, which applies the speed-variable conveyor to a handrail. As shown in FIG. 6, a fibrous body 101 is provided to cover a support table 111, a plurality of rollers 102 mounted on both ends in the width direction of the fibrous body through ropes 103 are supported by guide rails 104. Therefore, the fibrous body 101 is driven by drive means (not shown) to move while sliding on the support table 111. To make the moving speed of the fibrous body 101 variable, the position of the guide rails 104 may be changed so that a width B of the fibrous body 101 is changed. As shown, by making the moving speed of the fibrous body 101 variable and synchronized with the moving speed of the fibrous body 1, the speed-variable handrail can be applied as a handrail for a speed-variable moving footway.

Furthermore, next embodiments 3, 4, and 5 show examples of speed-variable conveyor in which a tension applied to the fibrous body is reduced to facilitate design and manufacture of a practical machine.

Embodiment 3

Embodiment 3 of the speed-variable conveyor according to the present invention will be described with reference to FIGS. 7 to 10.

Figure 7A:
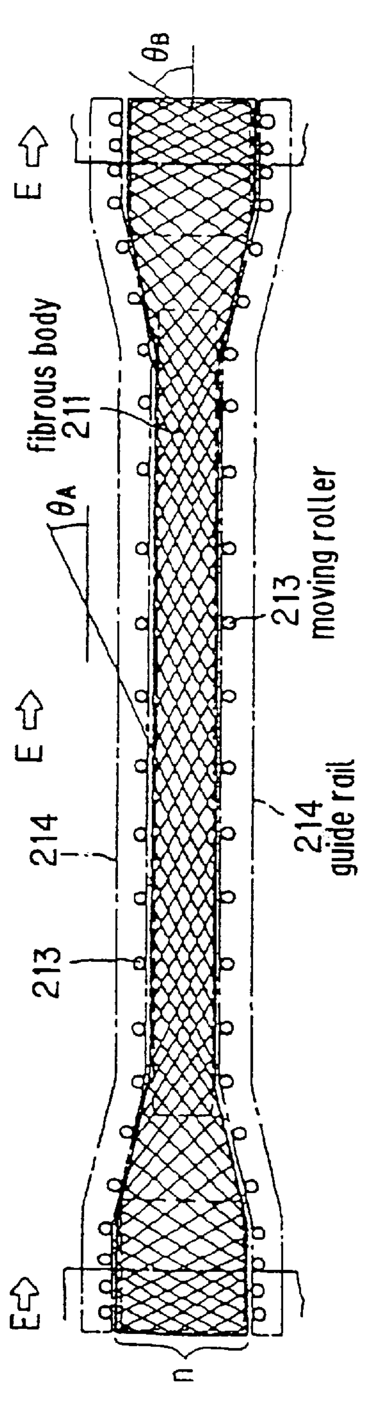
FIG. 7 shows the entire structure of an embodiment 3 according to the present invention, in which (a) is a plan view and (b) is a side view.
Figure 7B:
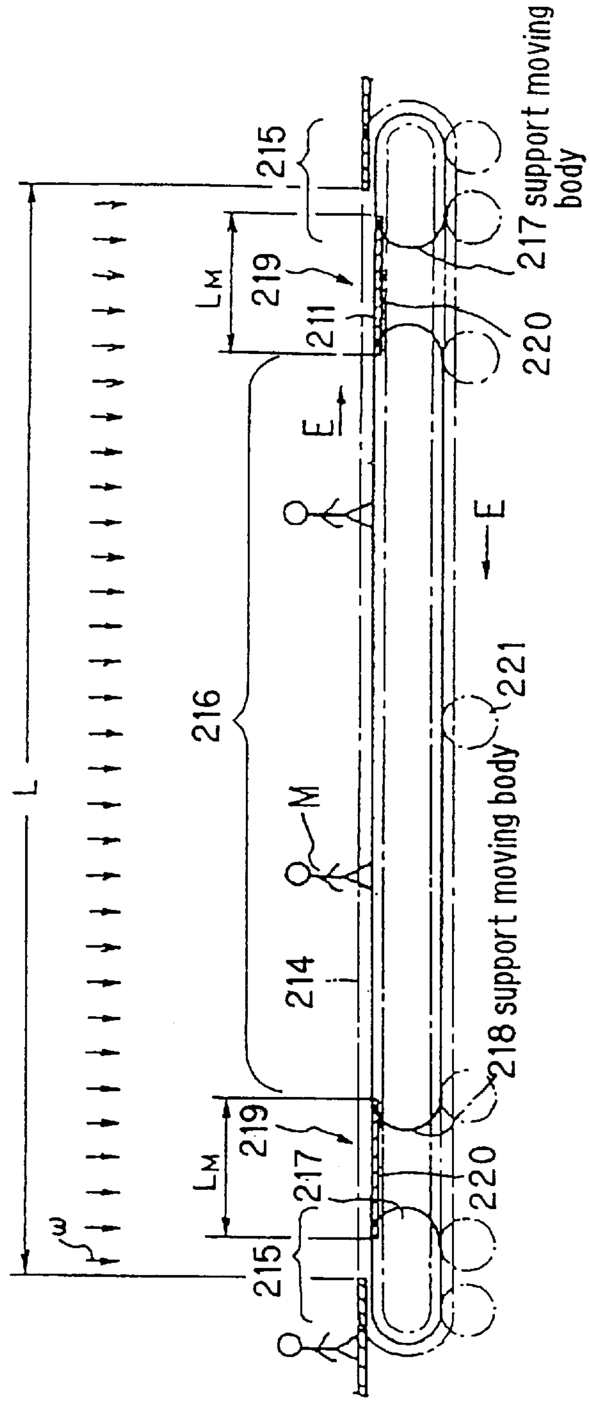
Figure 8A:
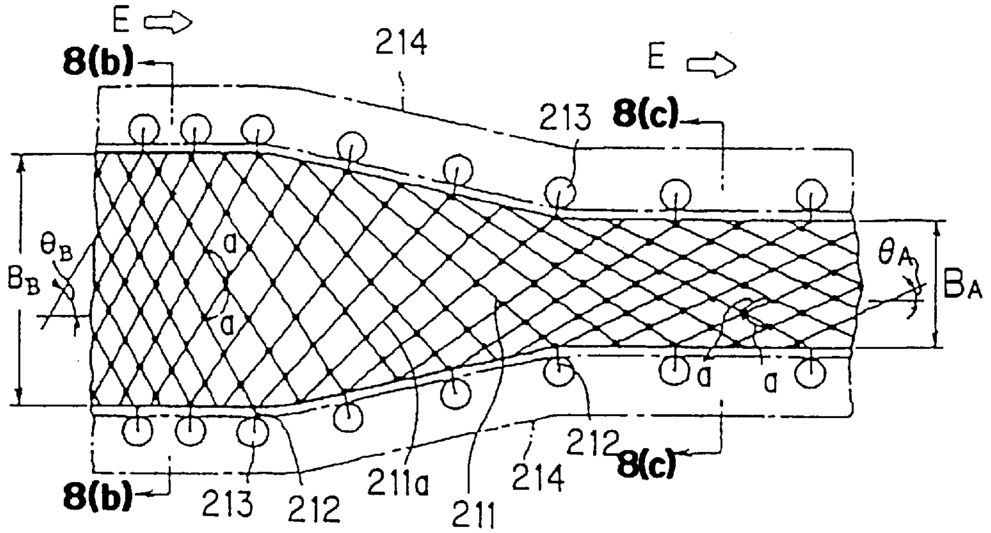
FIG. 8 shows part of the speed-variable conveyor of the embodiment 3 according to the present invention, in which (a) is a plan view, (b) is a cross sectional view taken along line B—B in (a), (c) is a cross sectional view taken along line A—A of (a), and (d) is an enlarged view showing part of the fibrous body shown in (a)
Figure 8B:
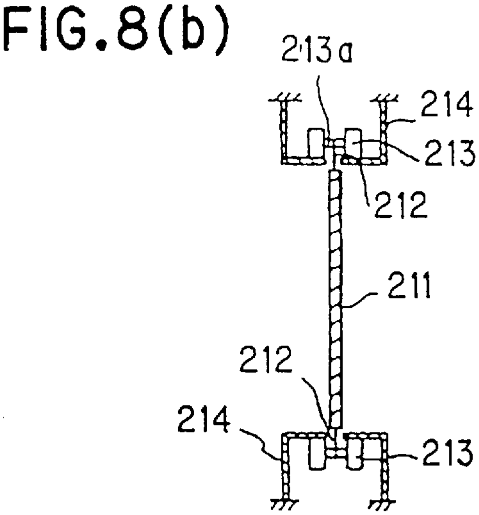
Figure 8C:
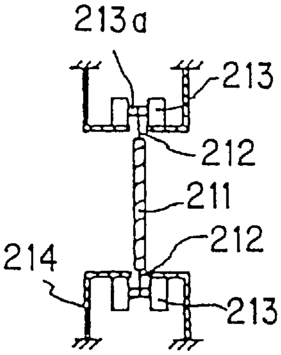
Figure 8D:
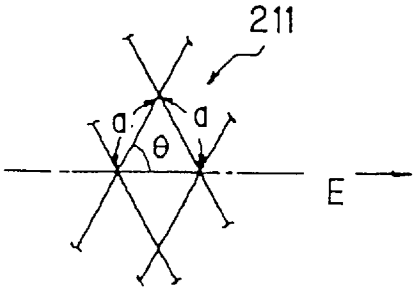
Figure 9C:
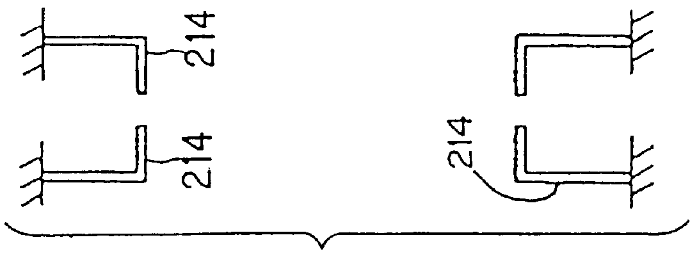
FIG. 9 shows guide rails of the speed-variable conveyor according to an embodiment 3 of the present invention, in which (a) is a plan view, (b) is a cross sectional view taken along line A—A of (a), and (b) is a cross sectional view taken along line B—B.
Figure 9B:
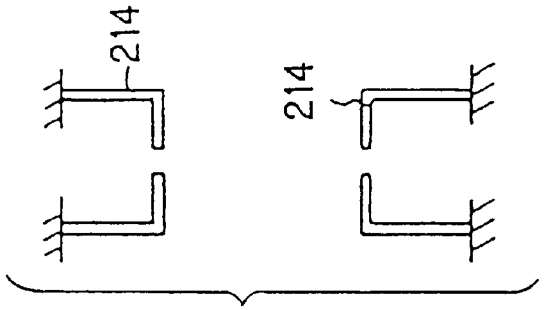
Figure 9A:
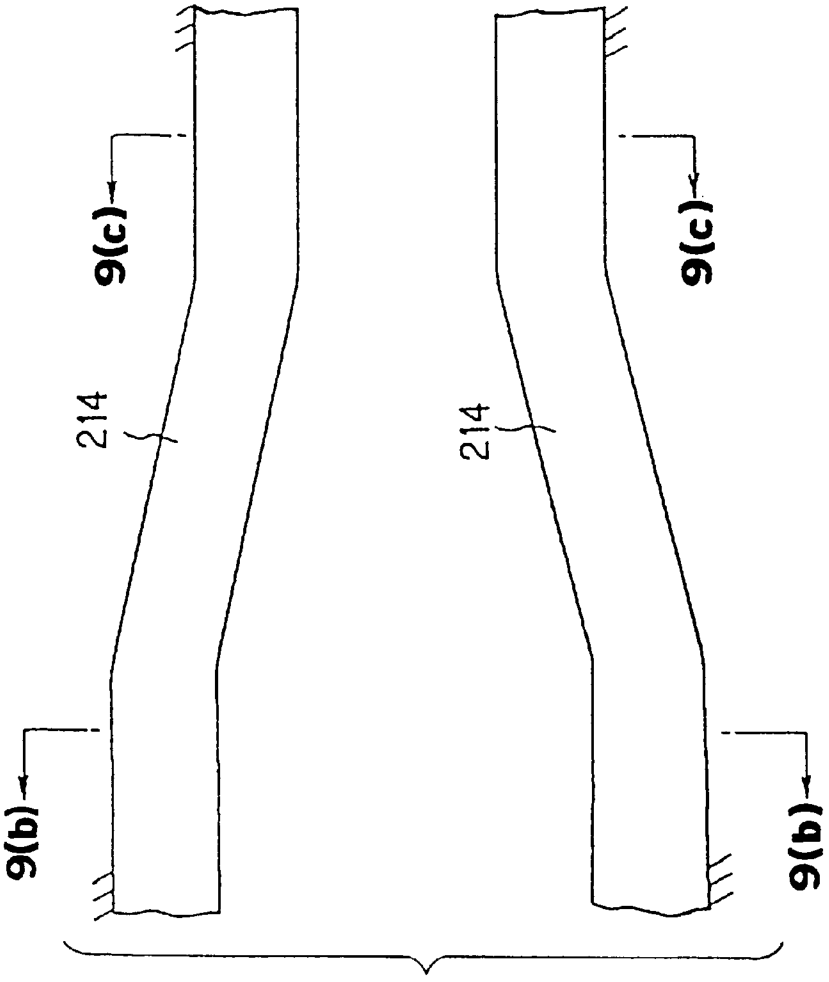

As shown in FIG. 7(*a*) fibrous body 211 is an endless body formed of a strong fiber with small elongation, constituted in the form of a net. The fibrous body 211 moves in a direction of the arrow E, and as shown in FIG. 8(*a*), moving rollers 213, as support members supported on a roller shaft 213*a*, are disposed with appropriate intervals through ropes 212. The moving rollers 213 are adapted to move while rolling in guide rails 214 having a channel cross section. That is, by giving an appropriate tension in the moving direction by the moving rollers 213 disposed on both sides of the fibrous body 211, the individual ropes 211*a* constituting the fibrous body 211 are nearly straight as shown.

The spacing between the two guide rails 214, as shown in FIG. 8, is wide in the cross section B—B to make the width of the fibrous body 211 to be $B_B$, and is narrow in the cross section A—A to have a width of $B_A$. Therefore, by the guide rails 214, the width is large at the get on/off ports and narrow midway. In this case, angle of the rope 211*a* constituting the fibrous body 211 with respect to the moving direction is $\theta_B$ at the cross section B—B side and $\theta_A$ to the cross section A—A side.

Figure 10A:
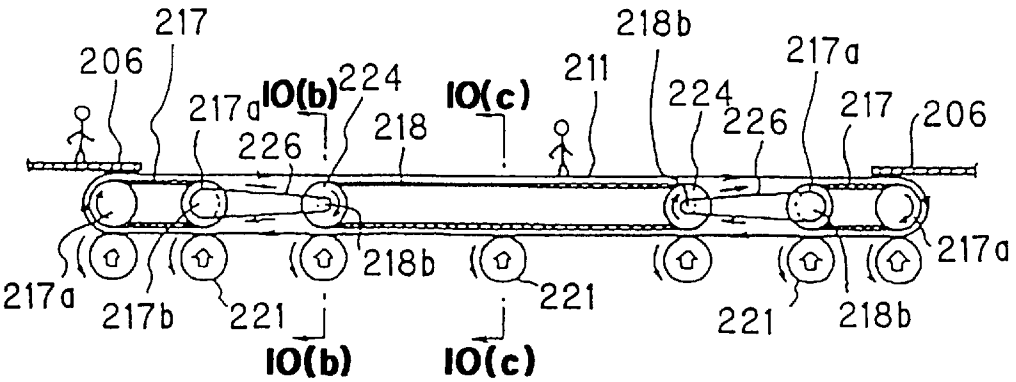
FIG. 10 is a schematic view for explaining the drive operation of the net-like fibrous body by the support moving body of the speed-variable conveyor according to the embodiment 3 of the present invention, in which (a) is a vertical cross sectional side view, (b) is a cross sectional view taken along line B—B, and (c) is a cross sectional view taken along line C—C.
Figure 10B:
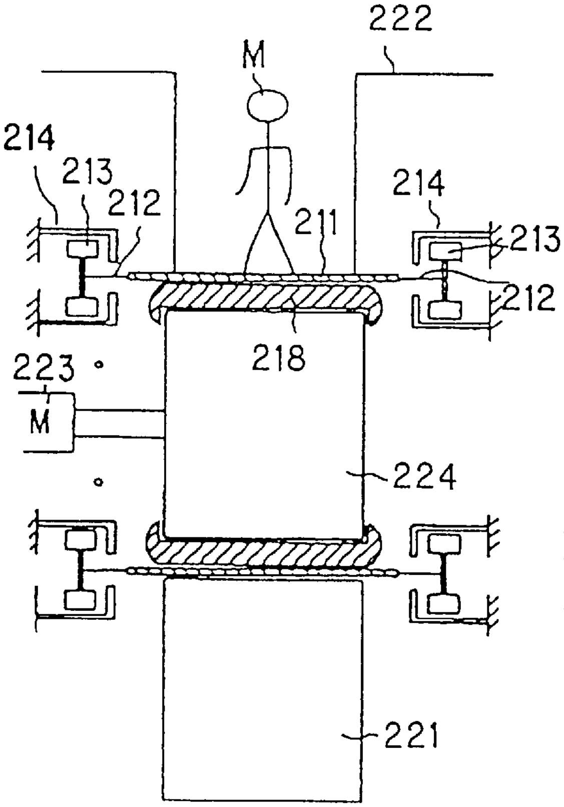
Figure 10C:
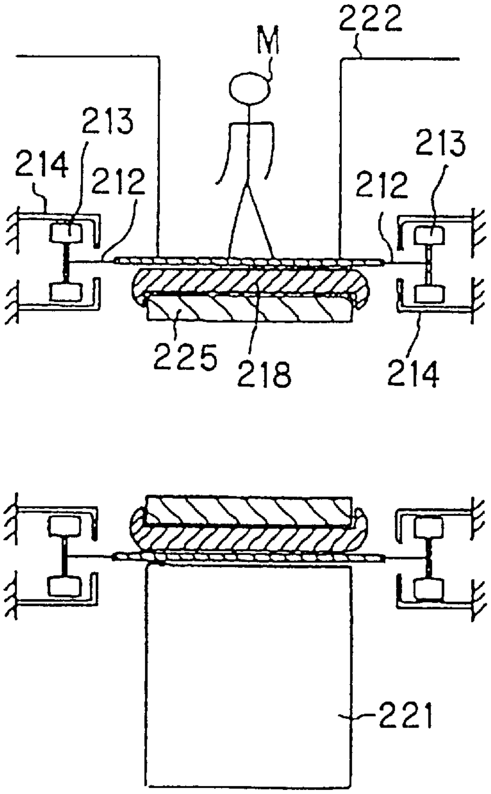

In FIGS. 8(*a*)–8(*d*), the speed of the fibrous body 211 is proportional to $\cos(\theta)$. Wherein $\theta$ is an angle of the moving direction to the rope 211*a*. Because of $\theta_B>\theta_A$, $\cos(\theta_A)>\cos(\theta_B)$, the speed at the cross section A—A is higher. To continuously change the speed of the fibrous body 211, as shown in FIG. 8(*a*), the width B may be continuously changed to continuously change $\theta$. Passengers M, as shown in FIG. 7(*b*), can get on and off at the low-speed sections, and carried at a high speed (high speed section) midway. Further, in this case, a vertical load of the passengers, in the constant-speed sections of the low-speed section 215 and the high-speed section 216, is supported by the support moving bodies 217 and 218, supported by the load support plate 220 in the speed-change section 219 so that an excess tension is not produced in the fibrous body 211. As shown in FIGS. 10(*a*)–10(*c*), the support moving body 217 is formed of an endless belt mounted on a pair of rollers 217*a*, the support moving body 218 is formed of an endless belt mounted on a pair of drive rollers 224, and the fibrous body 211 is driven by the support moving bodies 217 and 218 to move while sliding on the load support plate 220.

Further, the rollers 217*a* of the support moving body 217 are provided with a large-diameter sprocket 217*b*, the drive rollers 224 of the support moving body 218 are provided with a small-diameter sprocket 218*b*, and a chain 226 is provided between the large-diameter sprocket 217*b* and the small-diameter sprocket 218*b* to transmit the drive power.

Still further, as shown in FIGS. 10(*a*)–10(*c*), pressing rollers 221 are disposed underside (the side not used for transportation) of the fibrous body 211 with appropriate intervals in the moving direction, so that the fibrous body 211 is placed between the support moving bodies 217 and 218 to be driven in the direction of the arrow. The support moving body 218 is set at the center of the fibrous body 211 mounting the passengers M, and protected by a protective cover 222 so that the passengers M do not get on a position other than the support section. The support moving body 218 is driven by a motor 223 through a drive roller 224, and pressed by the pressing roller 221 against the fibrous body 211 to transmit the drive power to the fibrous body 211. In other portions, as shown in FIG. 10(*c*), the support moving body 218 is guided by a guide 225.

Next, the function of the speed-variable conveyor of the above arrangement will be described. When the motor 223 operates, the drive rollers 224 are rotated, and the rotation of the drive rollers 224 is transmitted to the fibrous body 211 through the support moving body 218. The rotation of the drive rollers 224 is transmitted to a roller 217*a* through a chain 226 to move the support moving body 217, thereby transmitting movement of the support moving body 217 to the fibrous body 211.

Therefore, the fibrous body 211 moves in the direction shown by the arrow E. In this case, the spacing of the two guide rails 214 is wide in the cross section B—B as shown in FIG. 8(*a*), the width of the fibrous body 211 is $B_B$, and in the cross section A—A, the spacing is narrow and the width is $B_A$.

In FIG. 8, the speed of the fibrous body is proportional to $\cos(\theta)$. Wherein $\theta$ is an angle of the moving direction with respect to the rope 211*a*. Because of $\theta_B>\theta_A$, and thus $\cos(\theta_A)>\cos(\theta_B)$, and the speed of the cross section A—A is higher.

In FIG. 7(*b*), where a total transportation distance is L a speed-change distance is $L_M$, the tension of the fibrous body 211 bears $L_M/L$ times a total transportation load W.

For example, when the apparatus shown in FIGS. 3 and 4 is operated with persons of 80 kg (equidistribution load $\omega$) at 1 m intervals over a transportation distance L=50 m, the total transportation weight ($W=L\times\omega$) is 4000 kg, when a frictional coefficient $\mu=0.2$ between the fibrous body 1 and the load support plate 10, a load of 800 kg is produced in the fibrous body 1 at the get-off port. With a number n=100 of knots in the width direction of the fibrous body 1 and the angle $\theta_B=60$ degrees of the mesh of the low-speed section, a tension of 8 kg is produced per rope constituting the fibrous body 1. Since a safety factor of 2 to 3 would be required, the fibrous body 1 must be made of ropes having a maximum tensile strength of about 24 kg.

Under the same conditions, when L=50 m and $L_M=5$ m, the burden is 1/10 of that of the apparatus shown in FIGS. 3 and 4. A required tensile strength of the rope 211*a* constituting the fibrous body 211 is a maximum of about 2.4 kg.

Embodiment 4

Figure 11:
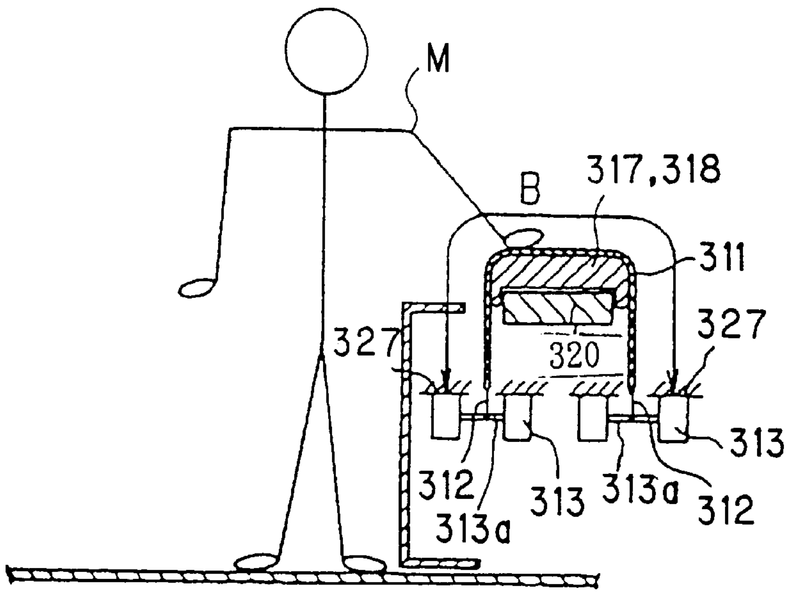
FIG. 11 is a schematic cross sectional view of a speed-variable handrail according to an embodiment 4 of the present invention.

FIG. 11 shows embodiment 4 according to the present invention, which applies the speed-variable conveyor to a handrail.

As shown in FIG. 11, a net-like fibrous body 311, in the constant-speed section, is supported/driven by a support moving bodies 317 and 318, and in the speed-change section, the fibrous body 311 moves while the support moving bodies slide on a load support plate 320. To make the speed of the fibrous body 311 variable, the position of a guide 327 may be changed so that the size of the width B of the fibrous body 311 is changed. As shown, by making the moving speed of the fibrous body 311 variable and synchronized with the moving speed of the fibrous body 211, as shown in FIG. 10, the speed variable handrail can be formed as a handrail for a speed-variable moving footway.

Embodiment 5

Figure 12:
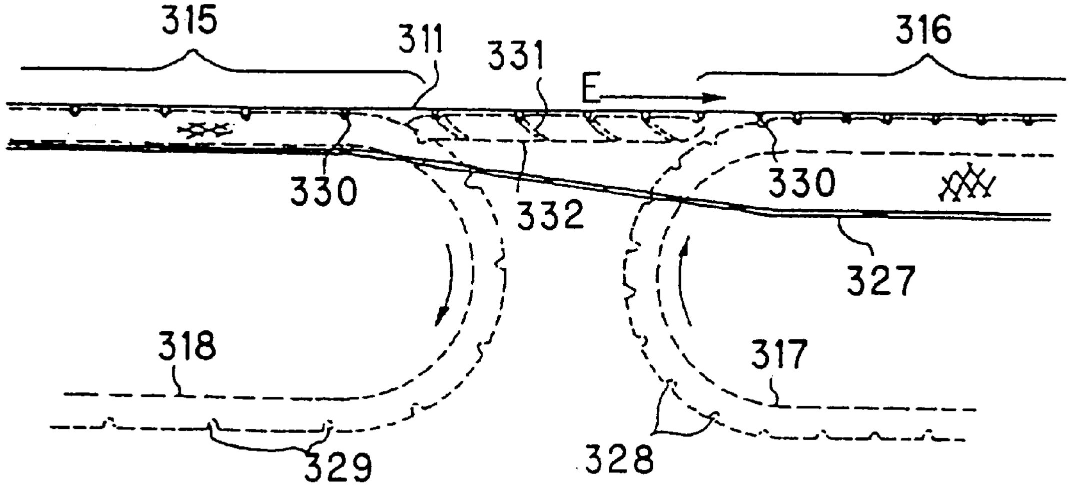
FIG. 12 is a schematic cross sectional view of a speed-variable handrail according to an embodiment 5 of the present invention.
Figure 13:
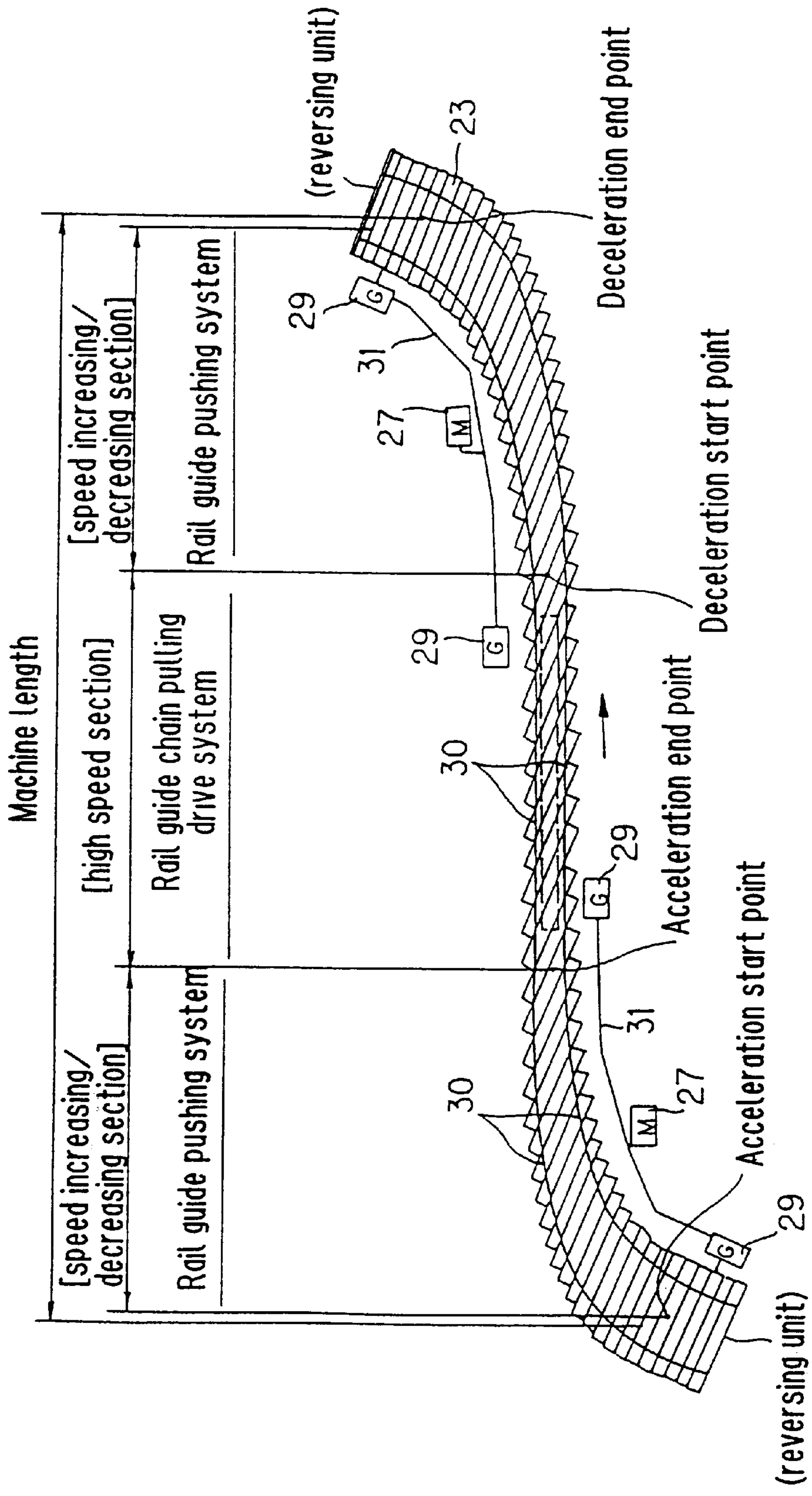
FIG.13 PRIOR ART
FIG. 13 is a schematic plan view showing a prior art speed-variable moving footway.
Figure 14:
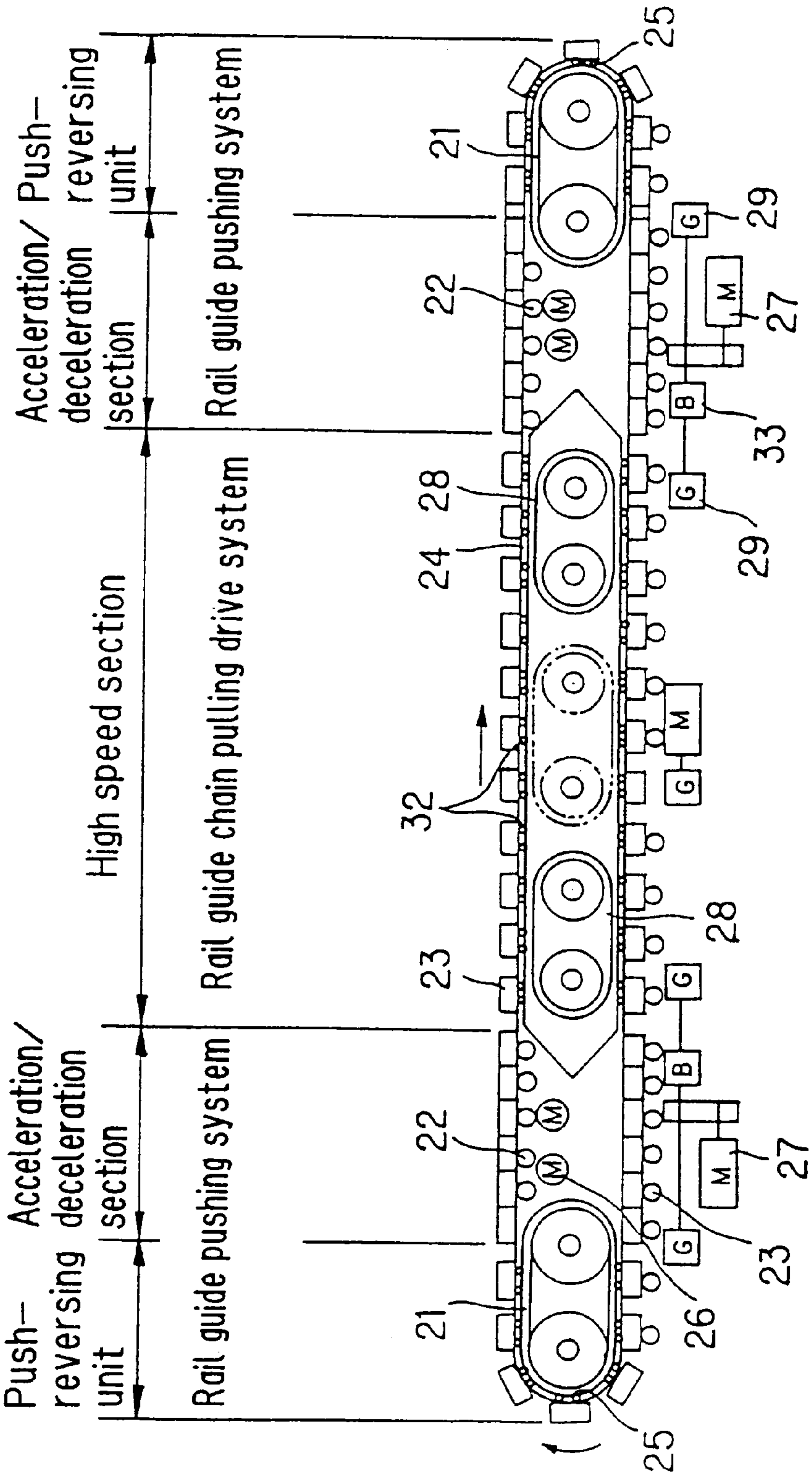
FIG.14 PRIOR ART
FIG. 14 is a schematic side view of the speed-variable moving footway shown in FIG. 13.
Figure 15:
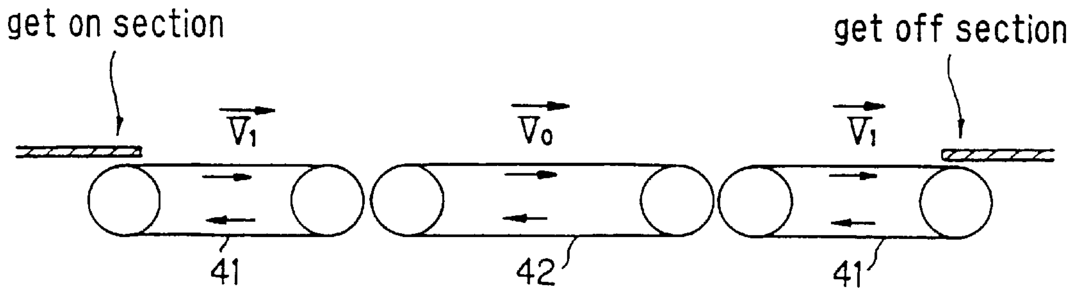
FIG.15 PRIOR ART
FIG. 15 is a schematic side view of another prior art speed-variable moving footway.

FIG. 12 shows embodiment 5 according to the present invention. The same components as the embodiment 4 have the same reference numerals and detailed description thereof is omitted. The embodiment 5 is a case where engaging unit is provided to synchronize the fibrous body 311 with the support moving bodies 317 and 318. That is, small pitch recesses 328 are provided in equal intervals on the outer periphery of the support moving body 317 comprising an endless belt constituting the low-speed section 315, and wide pitch recesses 329 are provided in equal intervals on the outer periphery of the support moving body 318 comprising an endless belt constituting the high-speed section 316. On the other hand, protrusions 330 engaging with the recesses 328 and 329 are provided on the inner periphery of the fibrous body 311.

Further, in the speed-change section between the support moving bodies 317 and 318, a synchronization screw 332, which has a spiral groove 331 changing in pitch from an end towards the other end and engaging with the protrusions 330, is rotatably provided.

Therefore, the protrusions 330 of the fibrous body 311, on the support moving body 318, engage with the wide pitch recesses 329, the fibrous body 311 moves at a high speed, when they come out of the support moving body 318, the protrusions 330 engage with the spiral groove 331 of the synchronization screw 332, the fibrous body 311 moves while rotating the synchronization screw 332, and the pitch of the protrusions 330 also gradually decreases. Further, the protrusions 330, on the support moving body 317, engage with the small pitch recesses 328, and the fibrous body 311 moves at a low speed.

Furthermore, the above arrangement for synchronizing the fibrous body with the support moving bodies by the engagement of the protrusions and the recesses can also be applied to the speed-variable conveyor of embodiment 3.

Yet further, in the above embodiment, the support moving bodies 217, 218, 317, and 318 are formed of endless belts. However, a pallet-formed structure may be used in which plate-formed bodies of the same width and same length are connected in parallel.

Yet further, although the speed-change section is supported by the load support plates 220 and 320, a roller conveyor may be used, or individual rollers of the roller conveyor may be driven to rotate. Yet further, it may also be arranged that moving rollers 213 and 313, provided on both sides of the fibrous bodies 211 and 311, are moved in synchronization with the support moving bodies 217, 218, 317, and 318.

As described above in detail with reference to the embodiments, with the speed-variable conveyor according to the present invention, the following advantageous effects can be obtained over the prior art pallet slide type or multi-stage conveyor type moving footway.

(1) There is no discontinuity in movement or speed change of the fibrous body. Therefore, when applied to a moving footway, it has no burden on the passengers, and the safety is further improved.

(2) When applied to a moving footway, the get on/off directions and the high-speed moving direction are the same.

(3) The number of parts is small, and is thus simple in structure.

(4) Therefore, the present invention can be expected to be used in practical applications as simple type speed-variable moving footway and speed-variable handrail.

Further, by providing the support moving bodies contacting the lower surface of the net-like fibrous body for driving the fibrous body, the tension applied to the ropes constituting the net-like fibrous body can be reduced, thereby facilitating design and manufacture of a practical machine.

The entire disclosure of Japanese Patent Applications No. 7-313856 filed on Dec. 1, 1995 and No. 8-250194 filed on Sep. 20, 1996 including specification, claims, drawings and summary are incorporated herein by reference in their entirety.

What is claimed is:

1. A speed variable conveyor, comprising:

a belt-formed fibrous body deformable in a moving direction and in a width direction;

movable supporting members for supporting both ends in the width direction of said fibrous body;

a pair of guide rails for movably supporting said supporting members and varying a width of said fibrous body by varying a distance between said rails to change moving speed of said fibrous body;

a support moving body provided in contact with a lower surface of said fibrous body;

a drive roller provided in contact with an inner surface of said support moving body;

a motor for driving said drive roller, said motor transmitting output torque directly to said drive roller; and a pressing roller adapted to urge the lower horizontal portion of said support moving body towards said drive roller.

2. The speed-variable conveyor as claimed in claim 1, wherein said support moving body is provided in a constant-speed section of said fibrous body.

3. The speed-variable conveyor as claimed in claim 1, wherein said support moving body is an endless belt.

4. The speed-variable conveyor as claimed in claim 2, wherein said support moving body is an endless belt.

5. The speed-variable conveyor as claimed in claim 1, wherein one of a protrusion and a recess provided in said fibrous body and the other of a protrusion and a recess provided in said support moving body engage with each other for synchronizing said fibrous body with said support moving body.

6. The speed-variable conveyor as claimed in claim 5, wherein said support moving body is provided in a constant-speed moving section of said fibrous body, and a synchronization screw is provided in a speed-change section between said support moving bodies, said synchronization screw having a spiral groove which changes in pitch from an end towards the other end and engages said protrusion of said fibrous body.

7. The speed-variable conveyor as claimed in claim 1, wherein said supporting member is a roller, and said roller is moved in synchronization with said support moving body.

8. The speed-variable conveyor as claimed in claim 1, wherein said speed-variable conveyor is a speed-variable moving footway, the width of said guide rails is increased at a get-on port and a get-off port of said speed-variable moving footway so that said fibrous body moves at a first speed, the width of said guide rails is narrowed in an intermediate section of said speed-variable moving footway so that said fibrous body moves at a second speed higher than the first speed, the width of the guide rails is gradually decreased in a boundary section from the get-on port to said intermediate section so that the moving speed of said fibrous body is gradually increased, and the width of said guide rails is gradually increased in a boundary section from said intermediate section to the get-off port so that the moving speed of said fibrous body is gradually decreased.

9. The speed-variable conveyor as claimed in claim 1, wherein said speed-variable conveyor is a speed-variable moving footway and a speed-variable handrail provide along said speed-variable moving footway, the width of said guide rails is increased at a get-on port and a get-off port of said speed-variable moving footway and said speed-variable handrail to decrease the moving speed of said fibrous body, the width of the guide rails is decreased in an intermediate section of said speed-variable moving footway and said speed-variable handrail to increase the moving speed of said fibrous body, the width of the guide rails is gradually decreased in a boundary section from the get-on port to said intermediate section to gradually increase the moving speed of said fibrous body, and the width of said guide rails is gradually increased in a boundary section from said intermediate section to the get-off port to gradually decrease the moving speed of said fibrous body, so that said speed-variable moving footway and the speed-variable handrail move in synchronization with each other.

10. The speed-variable conveyor as claimed in claim 1, wherein said fibrous body is in a form of a mesh.

11. The speed-variable conveyor as claimed in claim 1, wherein said support moving body sustains load placed on said fibrous body.

12. The speed-variable conveyor as claimed in claim 7, wherein said roller is connected to said fibrous body by a rope.

13. The speed-variable conveyor as claimed in claim 1, further comprising: at least one tire which moves said fibrous body in the moving direction; and a motor for driving said at least one tire.

14. A speed variable conveyor, comprising:

a belt-formed body deformable in a moving direction and in a width direction;

movable supporting members for supporting both ends in the width direction of said body;

a pair of guide rails for movably supporting said supporting members and varying a width of said body by varying a distance between said rails to change moving speed of said body;

a support moving body provided in contact with an inner surface of said fibrous body;

a drive roller provided in contact with an inner surface of said support moving body;

a motor for driving said drive roller, said motor transmitting output torque directly to said drive roller; and a pressing roller adapted to urge the lower horizontal portion of said support moving body towards said drive roller.

15. The speed-variable conveyor as claimed in claim 1, further comprising:

a stationary guide member provided in contact with the inner surface of support moving body.

16. The speed-variable conveyor as claimed in claim 15, wherein said guide being disposed where said drive roller is not provided.

17. The speed-variable conveyor as claimed in claim 1, wherein said support moving body is provided in a form of a horizontal loop, said horizontal loop having an upper horizontal portion and a lower horizontal portion, wherein an upper surface of said drive roller makes contact with the inner surface of the upper horizontal portion and a lower surface of said drive roller makes contact with the inner surface of the lower horizontal portion simultaneously.

18. A speed variable conveyor, comprising:

a belt-formed fibrous body deformable in a moving direction and in a width direction;

movable supporting members for supporting both ends in the width direction of said fibrous body;

a pair of guide rails for movably supporting said supporting members and varying a width of said fibrous body by varying a distance between said rails to change moving speed of said fibrous body;

a support moving body provided in contact with a lower surface of said fibrous body, said support moving body being provided in a form of a horizontal loop having an upper horizontal portion and a lower horizontal portion;

a drive roller driven by a motor, an upper surface of said drive roller making contact with the inner surface of the upper horizontal portion and a lower surface of said drive roller making contact with the inner surface of the lower horizontal portion simultaneously; and a pressing roller adapted to urge the lower horizontal portion of said support moving body towards said drive roller.

* * * * *